United States Patent
Guo et al.

(10) Patent No.: US 9,451,502 B2
(45) Date of Patent: Sep. 20, 2016

(54) SERVICE CONTROL METHOD AND SYSTEM, EVOLVED NODEB, AND PACKET DATA NETWORK GATEWAY

(71) Applicant: Huawei Technologies Co., Ltd., Shenzhen, Guangdong (CN)

(72) Inventors: Junxiang Guo, Shenzhen (CN); Lingyun Lei, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 115 days.

(21) Appl. No.: 13/889,706

(22) Filed: May 8, 2013

(65) Prior Publication Data
US 2013/0242733 A1    Sep. 19, 2013

Related U.S. Application Data

(63) Continuation-in-part of application No. PCT/CN2011/081261, filed on Oct. 25, 2011.

(30) Foreign Application Priority Data

Nov. 19, 2010   (CN) .......................... 2010 1 0551852

(51) Int. Cl.
*H04L 12/14*   (2006.01)
*H04W 28/10*   (2009.01)
(Continued)

(52) U.S. Cl.
CPC .......... *H04W 28/10* (2013.01); *H04L 12/1407* (2013.01); *H04L 47/20* (2013.01);
(Continued)

(58) Field of Classification Search
CPC . H04W 28/02; H04W 72/00; H04W 72/005; H04W 72/1263; H04W 4/00; H04W 88/16; H04W 72/12; H04L 12/1407
See application file for complete search history.

(56) References Cited

U.S. PATENT DOCUMENTS

| 2006/0142019 A1 | 6/2006 | Kroth et al. |
| 2008/0205275 A1* | 8/2008 | Rinne ................ H04L 12/5693 370/235 |

(Continued)

FOREIGN PATENT DOCUMENTS

| CN | 1859195 A | 11/2006 |
| CN | 1937623 A | 3/2007 |

(Continued)

OTHER PUBLICATIONS

Written Opinion of the International Searching Authority in corresponding PCT Patent Application No. PCT/CN2011/081261 (Jan. 19, 2012).

(Continued)

*Primary Examiner* — Jeffrey M Rutkowski
*Assistant Examiner* — Salvador E Rivas
(74) *Attorney, Agent, or Firm* — Leydig, Voit & Mayer, Ltd.

(57) ABSTRACT

Embodiments of the present invention disclose a service control method and system, an evolved NodeB, and a packet data network gateway, to perform resource scheduling on a packet. The method provided in an embodiment of the present invention includes: receiving, by an evolved NodeB, a packet; determining, by the evolved NodeB, a service control policy corresponding to the packet according to correspondence between a service application type and a service control policy and a service application type corresponding to the packet; and performing, by the evolved NodeB, resource scheduling on the packet according to the service control policy corresponding to the packet. Embodiments of the present invention further include a service control system, an evolved NodeB, and a packet data network gateway.

20 Claims, 11 Drawing Sheets

(51) Int. Cl.

| | | |
|---|---|---|
| *H04M 15/00* | (2006.01) | |
| *H04W 4/24* | (2009.01) | |
| *H04L 12/859* | (2013.01) | |
| *H04L 12/813* | (2013.01) | |
| *H04W 72/12* | (2009.01) | |
| *H04W 88/08* | (2009.01) | |
| *H04W 88/16* | (2009.01) | |
| *H04W 4/00* | (2009.01) | |

(52) U.S. Cl.
CPC .......... *H04L47/2475* (2013.01); *H04M 15/00* (2013.01); *H04M 15/66* (2013.01); *H04W 4/24* (2013.01); *H04W 4/00* (2013.01); *H04W 72/12* (2013.01); *H04W 88/08* (2013.01); *H04W 88/16* (2013.01)

(56) References Cited

U.S. PATENT DOCUMENTS

| | | | |
|---|---|---|---|
| 2008/0273553 A1 | 11/2008 | Wang et al. | |
| 2009/0073958 A1* | 3/2009 | Xu | H04L 65/80 370/352 |
| 2009/0296613 A1 | 12/2009 | Kahn et al. | |
| 2009/0300207 A1* | 12/2009 | Giaretta | H04L 12/1403 709/232 |
| 2010/0067400 A1* | 3/2010 | Dolganow | H04W 72/1236 370/253 |
| 2010/0067489 A1 | 3/2010 | Pelletier et al. | |
| 2010/0284278 A1* | 11/2010 | Alanara | H04L 47/11 370/235 |
| 2012/0026914 A1* | 2/2012 | Banerjee | H04L 41/12 370/253 |
| 2013/0039183 A1* | 2/2013 | Nooren | H04L 41/5019 370/235 |

FOREIGN PATENT DOCUMENTS

| | | | | |
|---|---|---|---|---|
| CN | 101102277 A | 1/2008 | | |
| CN | 101119211 A | 2/2008 | | |
| CN | 101541048 A | 9/2009 | | |
| CN | 101610494 A | 12/2009 | | |
| CN | 101692727 A | 4/2010 | | |
| CN | 101720075 A | 6/2010 | | |
| EP | 2416537 A1 | 2/2012 | | |
| EP | 2480015 A1 * | 7/2012 | ......... | H04L 12/1407 |
| JP | 2010522466 A | 7/2010 | | |
| JP | 2011524129 A | 8/2011 | | |
| RU | 2325788 C2 | 5/2008 | | |
| WO | WO 2008083630 A1 | 7/2008 | | |
| WO | WO 2008115125 A2 | 9/2008 | | |
| WO | WO 2009148539 A1 | 12/2009 | | |
| WO | WO 2010023646 A2 | 3/2010 | | |
| WO | WO 2010088490 A1 | 8/2010 | | |

OTHER PUBLICATIONS

International Search Report in corresponding PCT Patent Application No. PCT/CN2011/081261 (Jan. 19, 2012).

Extended European Search Report in corresponding European Patent Application No. 11841154.5 (Jun. 28, 2013).

"3GPP TS 23.401—3$^{rd}$ Generation Partnership Project; Technical Specification Group Services and system Aspects; General Packet Radio Service (GPRS) enhancements for Evolved Universal Terrestrial Radio Access Network (E-UTRAN) access (Release 10)," Sep. 2010, Version 10.1.0, 3$^{rd}$ Generation Partnership Project, Valbonne, France.

"3GPP TR 23.813—3$^{rd}$ Generation Partnership Project; Technical Specification Group Services and System Aspects; Study on Policy solutions and enhancements (Release 10)," Oct. 2010, Version 0.4.0, 3$^{rd}$ Generation Partnership Project, Valbonne, France.

* cited by examiner

SERVICE CONTROL METHOD AND SYSTEM, EVOLVED NODEB, AND PACKET DATA NETWORK GATEWAY

CROSS-REFERENCE TO RELATED APPLICATIONS

This application is a continuation-in-part of International Patent Application No. PCT/CN2011/081261, filed on Oct. 25, 2011, which claims priority to Chinese Patent Application No. 201010551852.1, filed on Nov. 19, 2010, both of which are hereby incorporated by reference in their entireties.

FIELD OF THE INVENTION

The present invention relates to the field of communication technologies, and in particular, to a service control method and system, an evolved NodeB, and a packet data network gateway.

BACKGROUND OF THE INVENTION

Currently, peer-to-peer (P2P, peer-to-peer) occupies a large quantity of network bandwidth resources, which causes network congestion to a varying degree. The deep packet inspection (DPI, Deep Packet Inspection) technology is introduced on mobile networks to implement service identification, service control, and service statistics functions in network operations.

In a current DPI implementation scheme, QoS (Quality of Service) of all services of a bearer is processed in the same way. That is, parameters, such as QoS, of the bearer are modified according to a DPI inspection result. This not only increases the quantity of network signalling but also affects normal running of other flows. For example, if the maximum rate of a flow is limited, the maximum rates of other flows of the bearer are subject to the same limitation. Evidently, in the prior art, a control policy implemented for a specific flow affects other flows inevitably, thereby degrading user experience.

SUMMARY OF THE INVENTION

Embodiments of the present invention provide a service control method and system, an evolved NodeB, and a packet data network gateway, to perform resource scheduling on a packet and avoid affecting other flows, thereby enhancing the performance of a system.

A service control method provided in one aspect of the present invention includes: receiving, by an evolved NodeB, correspondence between a service application type and a service control policy from a first entity, where the first entity is configured to implement a policy and charging enforcement function; obtaining, by the evolved NodeB, a service application type corresponding to a received packet; determining, by the evolved NodeB, a service control policy corresponding to the packet according to the correspondence between the service application type and the service control policy and the service application type corresponding to the packet; and performing, by the evolved NodeB, resource scheduling on the packet according to the service control policy corresponding to the packet.

A service control method provided in another aspect of the present invention includes: receiving, by a PDN-GW, correspondence between a service application type and a service control policy from a policy and charging rules function (PCRF) or an evolved NodeB; obtaining, by the PDN-GW, a service application type corresponding to a received packet; determining, by the PDN-GW, a service control policy corresponding to the packet according to the correspondence between the service application type and the service control policy and the service application type corresponding to the packet; and performing, by the PDN-GW, resource scheduling on the packet according to the service control policy corresponding to the packet.

An evolved NodeB provided in another aspect of the present invention includes: a receiving unit, configured to receive correspondence between a service application type and a service control policy from a first entity, where the first entity is configured to implement a policy and charging enforcement function; a service application type obtaining unit, configured to obtain a service application type corresponding to a received packet; a first service control policy determining unit, configured to determine a service control policy corresponding to the packet according to the correspondence between the service application type and the service control policy and the service application type corresponding to the packet; and a first scheduling unit, configured to perform resource scheduling on the packet according to the service control policy corresponding to the packet.

A packet data network gateway (PDN-GW) provided in another aspect of the present invention includes: correspondence receiving unit, configured to receive correspondence between a service application type and a service control policy from a policy and charging rules function (PCRF) or an evolved NodeB; a service application type determining unit, configured to obtain a service application type corresponding to a received packet; a second service control policy determining unit, configured to determine a service control policy corresponding to the packet according to the correspondence between the service application type and the service control policy and the service application type corresponding to the packet; and a second scheduling unit, configured to perform resource scheduling on the packet according to the service control policy corresponding to the packet.

A service control system provided in another aspect of the present invention includes an evolved NodeB and a first entity.

A service control system provided in another aspect of the present invention includes a PDN-GW, a PCRF, or an evolved NodeB.

In embodiments of the present invention, a service application type of a packet is obtained, so that a service control policy corresponding to the service application type of the packet can be obtained from service control policy information; and resource scheduling is performed on the packet according to the service control policy corresponding to the packet. In this way, a network can differentiate flows, and implement different control polices for different services, without affecting other flows, thereby enhancing the flexibility of network policy control and improving user experience.

DETAILED DESCRIPTION OF THE EMBODIMENTS

Embodiments of the present invention provide a service control method and system, an evolved NodeB, and a packet data network gateway, to perform policy control on a packet without affecting other flows, thereby enhancing the flexibility of network policy control and improving user experience.

Figure 1:
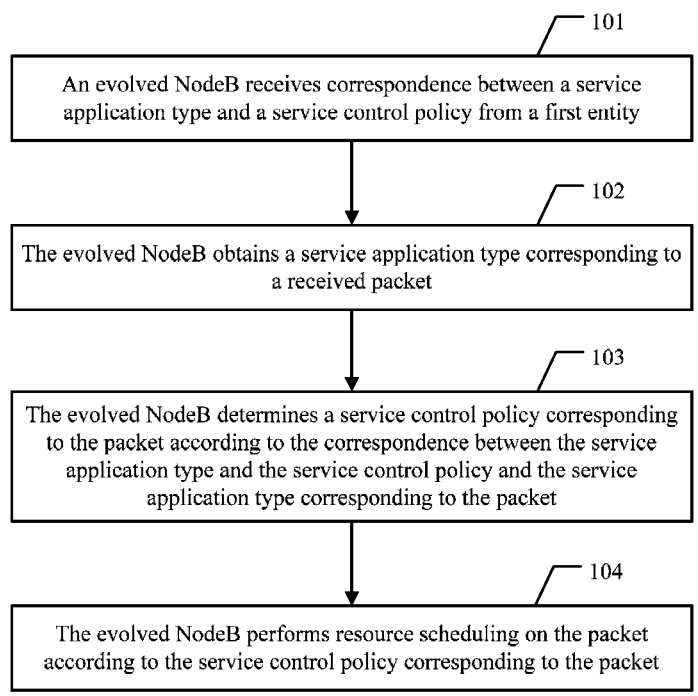
FIG. 1 is a schematic diagram of a service control method according to an embodiment of the present invention.

Referring to FIG. 1, an embodiment of a service control method according to an embodiment of the present invention includes the following steps.

101. An evolved NodeB receives correspondence between a service application type and a service control policy from a first entity.

In this embodiment, before service control is implemented, a policy and charging rules function (PCRF) may check a user privacy policy; after a PCEF interacts with the PCRF, the PCRF checks, by checking the obtained user privacy policy and user subscription information, whether a flow of a user is allowed to be inspected and which kind of service is allowed to be inspected; if the flow is allowed to be inspected, the PCRF sends, in combination with the control policy of an operator, a message that includes correspondence between a service application type and a service control policy to a first entity; the first entity sends the message to the evolved NodeB, so that the evolved NodeB receives the correspondence between the service application type and the service control policy.

It should be noted that in the embodiment of the present invention, the first entity may be a policy and charging enforcement function (PCEF) or a specific policy and charging enforcement function unit, which is not limited in actual applications.

102. The evolved NodeB obtains a service application type corresponding to a received packet.

In this embodiment, after receiving a packet, the evolved NodeB may obtain a service application type corresponding to the received packet, for example, the service application type may be QQ, MSN, BT, Email, HTTP, or the like.

103. The evolved NodeB determines a service control policy corresponding to the packet according to the correspondence between the service application type and the service control policy and the service application type corresponding to the packet.

After obtaining the service application type corresponding to the packet, the evolved NodeB can query, from the correspondence between the service application type and the service control policy, a service control policy corresponding to the packet.

104. The evolved NodeB performs resource scheduling on the packet according to the service control policy corresponding to the packet.

Performing resource scheduling on the packet by the evolved NodeB according to the service control policy corresponding to the packet includes scheduling actions such as normal forwarding (forwarding without resource control), limiting bandwidth, and lowering a priority.

For example, if the service control policy corresponding to the packet of a QQ service is "lowering a priority", the evolved NodeB processes the packet to lower the priority of the packet, and then sends the packet to a corresponding device or port.

In this embodiment, the evolved NodeB queries a service control policy corresponding to the packet in the correspondence between the service application type and the service control policy to perform resource scheduling on the packet. By using this method, the packet can be scheduled without affecting other traffic steams, thereby improving the flexibility of service scheduling.

Figure 1A:
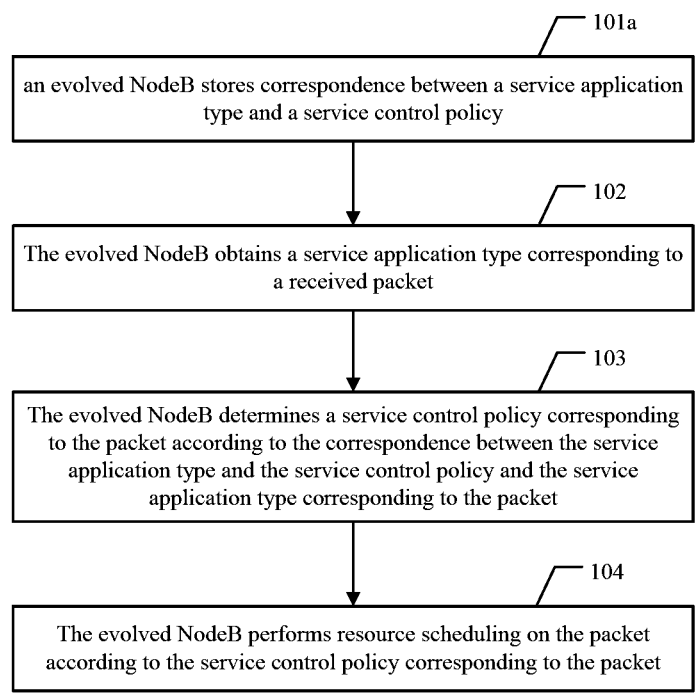
FIG. 1a is another schematic diagram of a service control method according to an embodiment of the present invention.

Referring to FIG. 1a, a service control method according to an embodiment of the present invention includes the step 101a, step 102, step 103 and step 104. This embodiment is similar to the embodiment as shown in FIG. 1, where step 102, step 103 and step 104 are respectively the same as the step 102, step 103 and step 104 in the embodiment as shown in FIG. 1, and the step 101a of this embodiment is different from the step 101.

In step 101a, an evolved NodeB stores correspondence between a service application type and a service control policy. That is, the correspondence between the service application type and the service control policy is stored, for example pre-configured, in the evolved NodeB instead of being received from other entity.

In this embodiment, there is no need for the evolved NodeB to implement the storage or configuration of the correspondence between the service application type and the service control policy before the obtaining of the service application type corresponding to the received packet. That is, this embodiment limits no certain sequence of step 101a and step 102.

Figure 2:
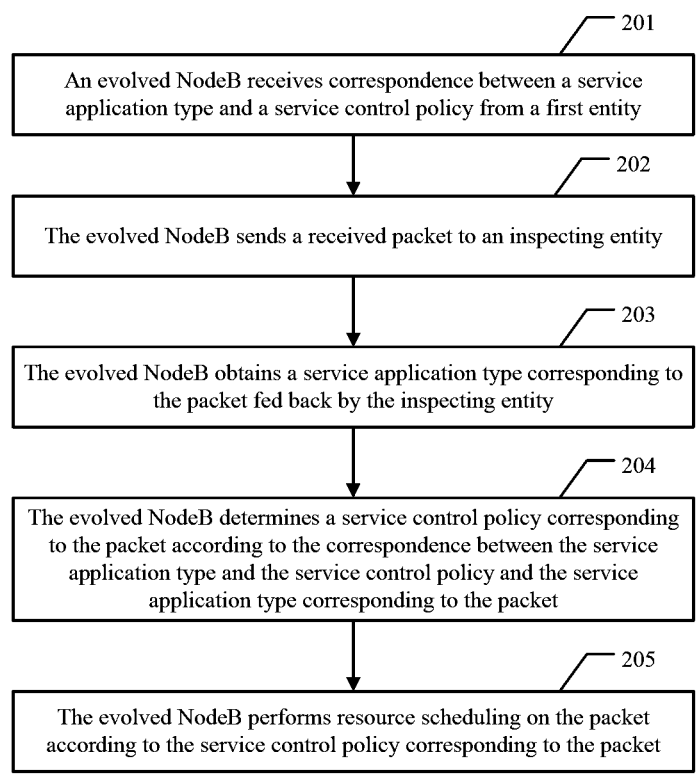
FIG. 2 is another schematic diagram of a service control method according to an embodiment of the present invention.

For better understanding of the technology, the following describes the service control method in detail. FIG. 2 is another embodiment of a service control method according to an embodiment of the present invention.

201. An evolved NodeB receives correspondence between a service application type and a service control policy from a first entity.

After a PCRF checks a user privacy policy, the PCRF sends service control policy information to the first entity; the first entity sends the service control policy information to the evolved NodeB, where the service control policy information includes correspondence between a service application type and a service control policy and is configured by an operator in the PCRF. The service control policy information may be carried in current control signalling for transmission. For example, the service control policy information is carried in a standby field or an extension field of current signalling or is carried by using a new information element in current signalling. Therefore, transmission of the service control policy information does not generate any new signalling.

It should be noted that in actual applications, the first entity may be integrated in the PDN-GW or be implemented independently, which is not specifically limited herein.

The service control policy information may also include information such as time segment and user type, and may form one or more correspondences among the time segment, the user type, the service application type, and the service control policy. Optionally, the time segment refers to a time segment at which service control policy information is used; the user type refers to classification of users, for example, ordinary user, copper medal user, silver medal user, golden medal user, and the like; the service application type refers to services used by a user, including QQ, MSN, BT, and HTTP; the service control policy refers to specific scheduling actions implemented on a service used by the user, including scheduling actions such as normal forwarding, limiting bandwidth, lowering a priority, and re-marking a priority. It should be noted that the service control policy information may also include other information used for index. The time segment, user type or other index information helps to use the service control policy information conveniently and search for a service control policy accurately.

202. The evolved NodeB sends a received packet to an inspecting entity.

In this embodiment, a PCEF receives a packet sent by a PCRF or a user equipment, and the evolved NodeB receives a packet sent by the PCEF, so that the received packet is sent to an inspecting entity.

The inspecting entity may be located in a packet data network gateway (PDN-GW), or may be used as an independent network entity. After inspecting the packet, the inspecting entity feeds back a service application type corresponding to the inspected packet to the evolved NodeB.

203. The evolved NodeB receives the service application type that is corresponding to the packet and is fed back by the inspecting entity.

204. The evolved NodeB determines a service control policy corresponding to the packet according to the correspondence between the service application type and the service control policy and the service application type corresponding to the packet.

In this embodiment, in step 201, if the evolved NodeB can obtain correspondence between a service application type and a service control policy from the first entity, after obtaining a service application type corresponding to the packet from the inspecting entity, the evolved NodeB can query a service control policy corresponding to the service application type in the correspondence.

205. The evolved NodeB performs resource scheduling on the packet according to the service control policy corresponding to the packet.

In this embodiment, the following cases are examples of resource scheduling that may be performed by the evolved NodeB on the packet:

(1) When the service control policy information corresponds to all or some flows of a user, the evolved NodeB controls the transmission and scheduling of resources of all or some flows of a user according to a service control policy corresponding to the packet. In this case, the PCRF delivers the service control policy information in a process of setting up flows of the user.

(2) When the service control policy information corresponds to a specific flow of all users or a group of users of the same level, the evolved NodeB controls the transmission and scheduling of resources of the specific flow of all users or a group of users of the same level according to a service control policy corresponding to the packet. In this case, the service control policy information does not need to be delivered each time a flow is set up and may be delivered when a flow is set up for the first time, or may be delivered by using signalling irrelevant to the setup of a flow. Then, the service control policy information needs to be delivered each time the policy is updated.

In this embodiment, the service control policy information is carried by using the signalling, so as to avoid adding new network signalling and ease the burden on a network. In addition, a service control policy corresponding to the packet is obtained according to the service control policy information and the obtained service application type corresponding to the packet; and resource scheduling is performed on the packet according to the obtained service control policy corresponding to the packet. The network can differentiate flows to which the packet belongs, and perform resource scheduling according to a specific service application type, without affecting normal operations of other flows, thereby enhancing the flexibility of network control and improving user experience. Furthermore, because the evolved NodeB performs resource scheduling on the packet, the evolved NodeB can perform service control according to the utilization of resources of the evolved NodeB.

In this embodiment, an evolved NodeB sends a packet to an inspecting entity; and the inspecting entity feeds back an inspected service application type corresponding to the packet to the evolved NodeB. In actual applications, the evolved NodeB may also obtain a service application type corresponding to a packet by using other methods. For example, referring to FIG. 3, another embodiment of a service control method includes the following steps.

301. An evolved NodeB receives correspondence between a service application type and a service control policy from a first entity.

Step 301 is the same as step 201 in the foregoing embodiment, and is not further described herein.

302. The evolved NodeB obtains filter information from a PDN-GW.

The PDN-GW sends filter information to a mobility management entity via a serving gateway; the mobility management entity sends an initial context request or a bearer setup request to the evolved NodeB, where the initial context request or the bearer setup request includes filter information. In this way, the evolved NodeB obtains the filter information.

In this embodiment, the filter is a packet filter or a quintuple filter. If the filter is a packet filter, the filter information includes a filter identifier and direction, a matching priority of the packet filter, a length of the packet filter, and content of packet filter. If the filter is a quintuple filter, the filter information includes a source address, a source port number, a protocol type, a destination address, and a destination port number.

It should be noted that the evolved NodeB may receive the filter information from the PDN-GW or obtain the filter information by analyzing the quintuple of a received packet.

The way of obtaining the filter information by the evolved NodeB depends on actual situations, which is not limited herein.

It should be noted that in actual applications, step 302 may be performed before step 301, or step 302 and step 301 are performed concurrently, which is not limited herein.

303. The evolved NodeB determines an identity of a flow by using a filter, where the received packet belongs to the flow.

In this embodiment, the identity of the flow may be a filter identifier or a flow queue identifier.

304. The evolved NodeB searches for a service application type corresponding to the identity of the flow to which the packet belongs in mapping between an identity of a flow and a service application type.

The mapping between the identity of the flow and the service application type is stored by the evolved NodeB or provided by the PDN-GW to the evolved NodeB. A service application type corresponding to the packet can be obtained from the mapping between the identity of the flow and the service application type according to the identity of the flow, where the packet belongs to the flow.

305. The evolved NodeB determines a service control policy corresponding to the packet according to the correspondence between the service application type and the service control policy and the service application type corresponding to the packet.

In this embodiment, in step 301, the evolved NodeB may obtain correspondence between a service application type and a service control policy from a first entity, after determining a service application type corresponding to the packet, the evolved NodeB can query for a service control policy corresponding to the service application type in the correspondence.

306. The evolved NodeB performs resource scheduling on the packet according to the service control policy corresponding to the packet.

Step 306 is the same as step 205 in the foregoing embodiment, and is not further described herein.

With this embodiment, burden on a network can be eased, and resource scheduling can be performed according to a specific service application type without affecting normal operations of other flows, thereby enhancing the flexibility of network control and improving user experience.

Figure 4:
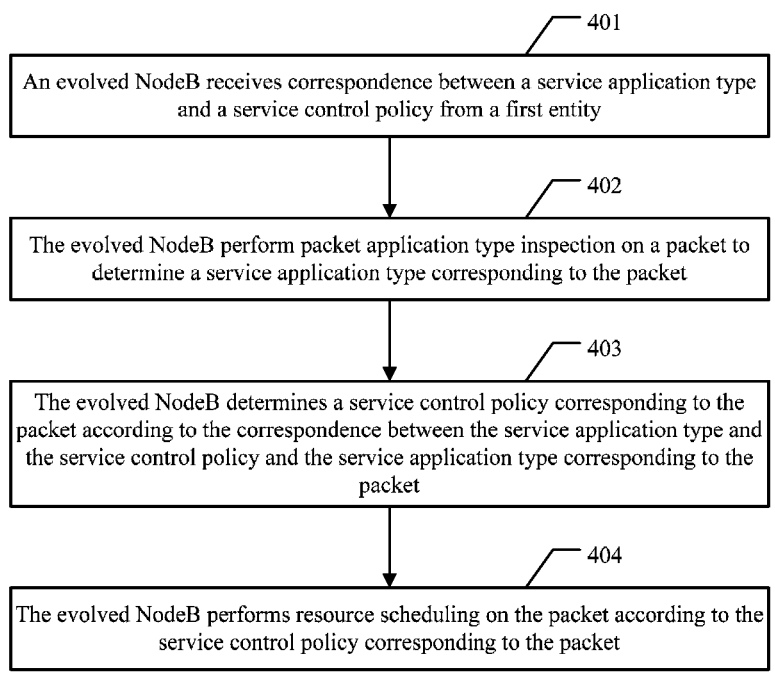
FIG. 4 is another schematic diagram of a service control method according to an embodiment of the present invention.

In this embodiment, the evolved NodeB obtains, by using a filter, an identity of a flow to which a packet belongs, and then searches for a service application type corresponding to the packet in mapping between an identity of a flow and a service application type according to the obtained identity of the flow to which the packet belongs. In actual applications, the evolved NodeB may also obtain a service application type corresponding to a packet by using other methods. For example, referring to FIG. 4, another embodiment of a service control method includes the following steps:

401. An evolved NodeB receives correspondence between a service application type and a service control policy from a first entity.

Step 401 is the same as step 201 in the foregoing embodiment, and is not further described herein.

402. The evolved NodeB performs packet application type inspection on a packet to determine a service application type corresponding to the packet.

The evolved NodeB may include a module capable of inspecting the packet. In this case, the evolved NodeB does not need to send the packet to an inspecting entity and nor does it need to determine, by using a filter, an identity of a flow to which the packet belongs. The evolved NodeB performs packet application type inspection on the packet by using the inspecting module of the evolved NodeB to determine a service application type corresponding to the packet. The specific packet application type inspection may be deep packet inspection or other inspection ways that can determine a service application type corresponding to the packet, which is not specifically limited herein.

After obtaining the service application type corresponding to the packet, the evolved NodeB can set up mapping between an identity of a flow to which the packet belongs and a service application type. Optionally, after setting up the mapping between the identity of the flow to which the packet belongs and the service application type, the evolved NodeB adds the mapping between the identity of the flow to which the packet belongs and the service application type to the existing mapping between an identity of a flow and a service application type for subsequent matching. The evolved NodeB also sends the mapping between the identity of the flow to which the packet belongs and the service application type or the updated identity of the flow and the updated service application type to the PDN-GW.

403. The evolved NodeB determines a service control policy corresponding to the packet according to the correspondence between the service application type and the service control policy and the service application type corresponding to the packet.

404. The evolved NodeB performs resource scheduling on the packet according to the service control policy corresponding to the packet.

Step 404 is the same as step 205 in the foregoing embodiment, and is not further described herein.

With this embodiment, burden on a network can be eased, and resource scheduling can be performed according to a specific service application type without affecting normal operations of other flows, thereby enhancing the flexibility of network control and improving user experience.

Figure 5:
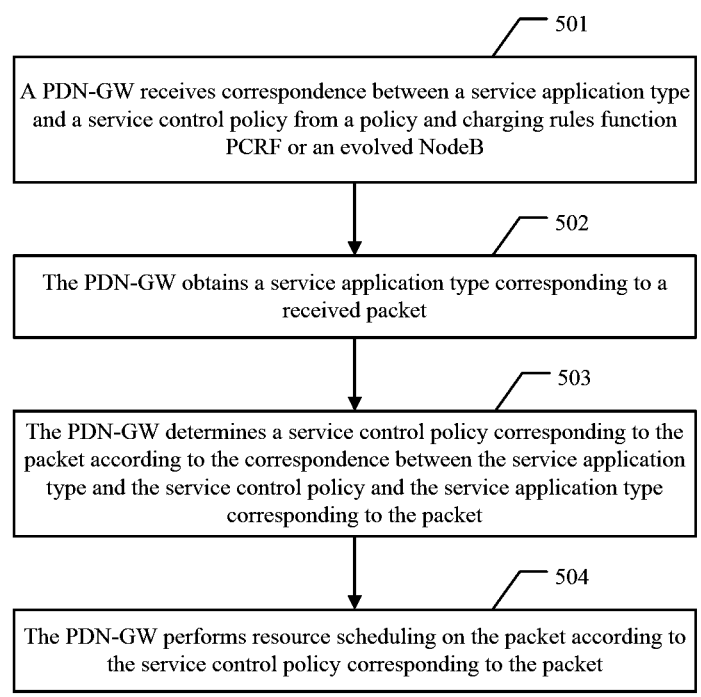
FIG. 5 is another schematic diagram of a service control method according to an embodiment of the present invention.

The service control method provided in the foregoing embodiment is performed by the evolved NodeB. However, in actual applications, the service control method may also be performed by the PDN-GW. For example, referring to FIG. 5, another embodiment of service control includes the following steps.

501. A PDN-GW receives correspondence between a service application type and a service control policy from a policy and charging rules function (PCRF) or an evolved NodeB.

In the embodiment of the present invention, before service control is implemented, the PCRF needs to check a user privacy policy; the PCRF checks, by checking the obtained user privacy policy and user subscription information, whether a flow of a user is allowed to be inspected and which kind of service is allowed to be inspected; if the flow is allowed to be inspected, the PCRF sends, in combination with the control policy of an operator, a message that includes correspondence between a service application type and a service control policy to a first entity; the first entity sends the message to the evolved NodeB, so that the evolved NodeB receives the correspondence between the service application type and the service control policy. Then, the evolved NodeB may send the correspondence to the PDN-GW.

It should be noted that if the evolved NodeB stores the correspondence, the evolved NodeB may send the correspondence to the PDN-GW directly.

In addition, if the PCRF determines that a flow of a user is allowed to be inspected, the PCRF may also send the correspondence to the PDN-GW directly in a process of setting up an IP-CAN session with the PDN-GW.

502. The PDN-GW obtains a service application type corresponding to a received packet.

In this embodiment, the PDN-GW receives a packet sent by the PCRF or a user equipment. It should be noted that after receiving the packet, the PDN-GW may obtain a service application type corresponding to the received packet, where the service application type may include QQ, MSN, BT, Email, and HTTP.

503. The PDN-GW determines a service control policy corresponding to the packet according to the correspondence between the service application type and the service control policy and the service application type corresponding to the packet.

After obtaining the service application type corresponding to the packet, the PDN-GW can query, from the correspondence between the service application type and the service control policy, a service control policy corresponding to the packet.

504. The PDN-GW performs resource scheduling on the packet according to the service control policy corresponding to the packet.

Performing resource scheduling on the packet by the PDN-GW according to the service control policy corresponding to the packet includes scheduling actions such as normal forwarding (forwarding without resource control), limiting bandwidth, and lowering a priority.

In the embodiment of the present invention, the PDN-GW queries, from correspondence between a service application type and a service control policy, a service control policy corresponding to a packet to perform resource scheduling on the packet. By using this method, the packet can be scheduled without affecting other traffic flows, thereby improving the flexibility of service scheduling.

Figure 6:
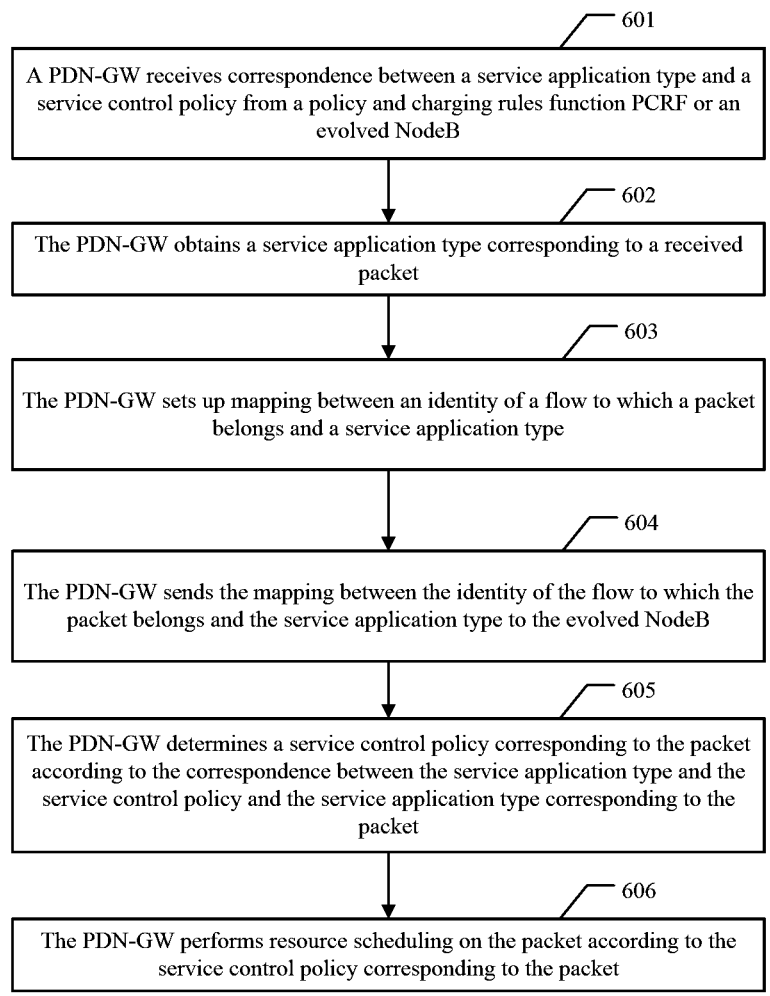
FIG. 6 is another schematic diagram of a service control method according to an embodiment of the present invention.

For better understanding of the technology, FIG. 6 illustrates another embodiment of service control according to an embodiment of the present invention. Specific steps include the following:

601. A PDN-GW receives correspondence between a service application type and a service control policy from a policy and charging rules function (PCRF) or an evolved NodeB.

The step of receiving correspondence between a service application type and a service control policy from the PCRF by the PDN-GW is specifically as follows: After receiving an IP-CAN bearer setup request, the PDN-GW sends an IP-CAN session setup request message to the PCRF; after checking a user privacy policy, the PCRF feeds back service control policy information to the PDN-GW, where the service control policy information includes the correspondence between the service application type and the service control policy. The service control policy information is carried in existing control signalling. For example, the information occupies a standby field or an extension field of existing signalling. Therefore, transmission of the service control policy information does not generate any new signalling.

The service control policy information may also include information such as time segment and user type, and can set up one or more correspondences among the time segment, the user type, the service application type, and the service control policy. The time segment refers to a time segment at which service control policy information is used; the user type refers to classification of users, for example, ordinary user, copper medal user, silver medal user, golden medal user, and the like; the service application type refers to services used by a user, including QQ, MSN, BT, and HTTP; the service control policy refers to specific scheduling actions implemented on a service used by the user, including scheduling actions such as normal forwarding, limiting bandwidth, lowering a priority, and re-marking a priority. It should be noted that the service control policy information may also include other information used for index. The time segment, user type or other index information helps to use the service control policy information conveniently and search for a service control policy accurately.

In the embodiment of the present invention, receiving correspondence between a service application type and a service control policy by the PDN-GW from the evolved NodeB is mainly as follows: The PDN-GW receives service control policy information sent by the evolved NodeB.

602. The PDN-GW obtains a service application type corresponding to a received packet.

In this embodiment, after receiving a packet, the PDN-GW may obtain a service application type corresponding to the received packet. The specific obtaining process may use the following ways:

(1) The PDN-GW sends the packet to an inspecting entity to inspect a service application type corresponding to the packet, and receives the feedback from the inspecting entity.

The inspecting entity may be located in the evolved NodeB or be implemented independently.

(2) The PDN-GW determines a service application type corresponding to the packet by using a filter.

Figure 3:
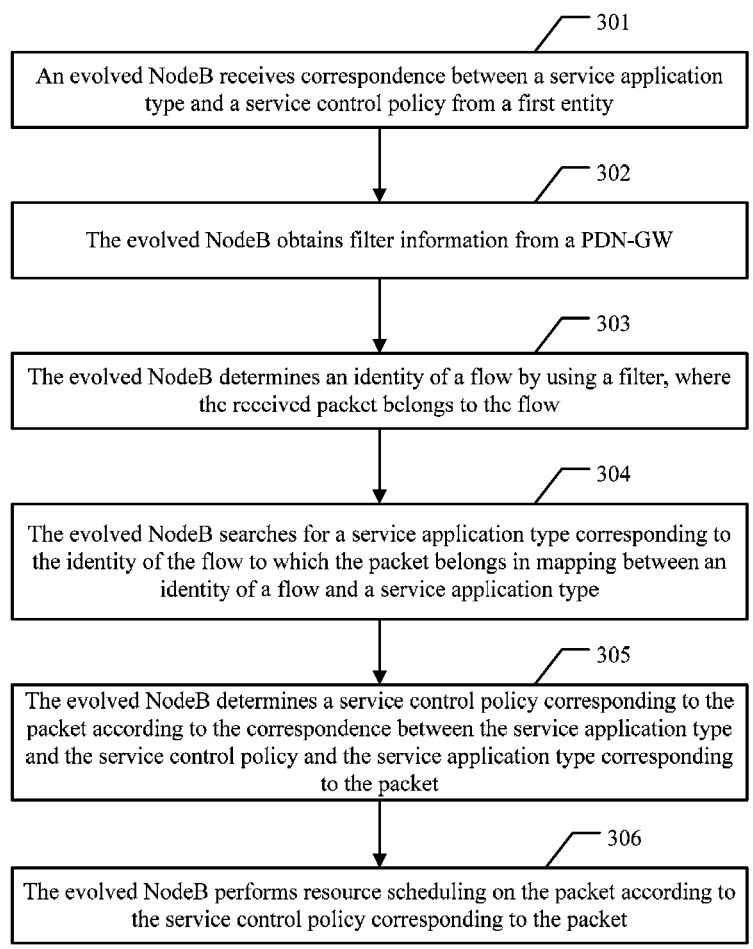
FIG. 3 is another schematic diagram of a service control method according to an embodiment of the present invention.

The PDN-GW stores filter information, where the content of the filter information is the same as the content of the filter information illustrated in the embodiment in FIG. 3 and is not further described herein.

Specifically, the PDN-GW may determine, by using a filter, an identity of a flow to which the received packet belongs, search for a service application type corresponding to the identity of the flow to which the packet belongs in mapping between an identity of a flow and a service application type, where the mapping between the identity of the flow and the service application type is sent by the evolved NodeB to the PDN-GW.

The identity of the flow may be a filter identifier or a flow queue identifier.

(3) The PDN-GW determines a service application type corresponding to the packet by using packet application type inspection.

The PDN-GW performs packet application type inspection on the packet to determine a service application type corresponding to the packet. The specific packet application type inspection may be deep packet inspection or other inspection ways that can determine a service application type corresponding to the packet, which is not specifically limited herein.

603. The PDN-GW sets up mapping between an identity of a flow to which a packet belongs and a service application type.

When the PDN-GW determines a service application type corresponding to the packet by using packet application inspection, the PDN-GW may set up mapping between an identity of a flow to which a packet belongs and a service application type. In this case, in inspection of a subsequent packet, the PDN-GW can obtain a service application type corresponding to the packet preferentially according to the mapping between the identity of the flow and the service application type.

604. The PDN-GW sends the mapping between the identity of the flow to which the packet belongs and the service application type to the evolved NodeB.

After setting up the mapping between the identity of the flow to which the packet belongs and the service application type, the PDN-GW can send the mapping to the evolved NodeB, so that the evolved NodeB can obtain the service application type corresponding to the packet according to the updated mapping between the identity of the flow and the service application type, without the need of inspecting the received packet.

In this embodiment, step 603 and step 604 are optional steps, and are performed only when the PDN-GW determines a service application type corresponding to the packet by using packet application type inspection.

605. The PDN-GW determines a service control policy corresponding to the packet according to the correspondence between the service application type and the service control policy and the service application type corresponding to the packet.

After obtaining the service application type corresponding to the packet, the PDN-GW can query, from the correspondence between the service application type and the service control policy, a service control policy corresponding to the packet.

606. The PDN-GW performs resource scheduling on the packet according to the service control policy corresponding to the packet.

In this embodiment, the following cases are examples of resource scheduling that may be performed by the PDN-GW on the packet:

(1) When the service control policy information corresponds to all or some flows of a user, the PDN-GW controls the transmission and scheduling of resources of all or some flows of a user according to a service control policy corresponding to the packet. In this case, the PCRF delivers the service control policy information in a process of setting up flows of the user.

(2) When the service control policy information corresponds to a specific flow of all users or a group of users of the same level, the PDN-GW controls the transmission and scheduling of resources of the specific flow of all users or a group of users of the same level according to a service control policy corresponding to the packet. In this case, the service control policy information does not need to be delivered each time a flow is set up and may be delivered when a flow is set up for the first time, or may be delivered by using signalling irrelevant to the set up of a flow. Then, the service control policy information only needs to be delivered each time the policy is updated.

In the embodiment of the present invention, the PDN-GW queries, from the correspondence between the service application type and the service control policy, a service control policy corresponding to the packet to perform resource scheduling on the packet. By using this method, the packet can be scheduled without affecting other traffic steams, thereby improving the flexibility of service scheduling.

Figure 7:
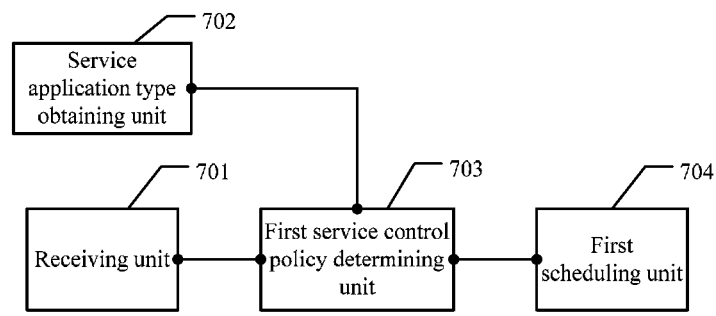
FIG. 7 is a schematic diagram of an evolved NodeB according to an embodiment of the present invention.

FIG. 7 illustrates an embodiment of an evolved NodeB according to an embodiment of the present invention, including:

a receiving unit 701, configured to receive correspondence between a service application type and a service control policy from a first entity, where the first entity is configured to implement a policy and charging enforcement function;

a service application type obtaining unit 702, configured to obtain a service application type corresponding to a received packet;

a first service control policy determining unit 703, configured to determine a service control policy corresponding to the packet according to the correspondence between the service application type and the service control policy and the service application type corresponding to the packet; and a first scheduling unit 704, configured to perform resource scheduling on the packet according to the service control policy corresponding to the packet.

In the embodiment of the present invention, the receiving unit 701 receives correspondence between a service application type and a service control policy from a first entity; the service application type obtaining unit 702 obtains a service application type corresponding to a received packet; the first service control policy determining unit 703 determines a service control policy corresponding to the packet according to the correspondence between the service application type and the service control policy received by the receiving unit 701 and the service application type corresponding to the packet obtained by the service application type obtaining unit 702, and sends the obtained service control policy to the first scheduling unit 704; the first scheduling unit 704 performs resource scheduling on the packet according to the service control policy corresponding to the packet.

In the embodiment of the present invention, an evolved NodeB performs resource scheduling on a packet by using a service control policy corresponding to the packet, which can effectively avoid affecting other flows when resource scheduling is performed on the packet, thereby enhancing the flexibility of network policy control and improving user experience.

Figure 8:
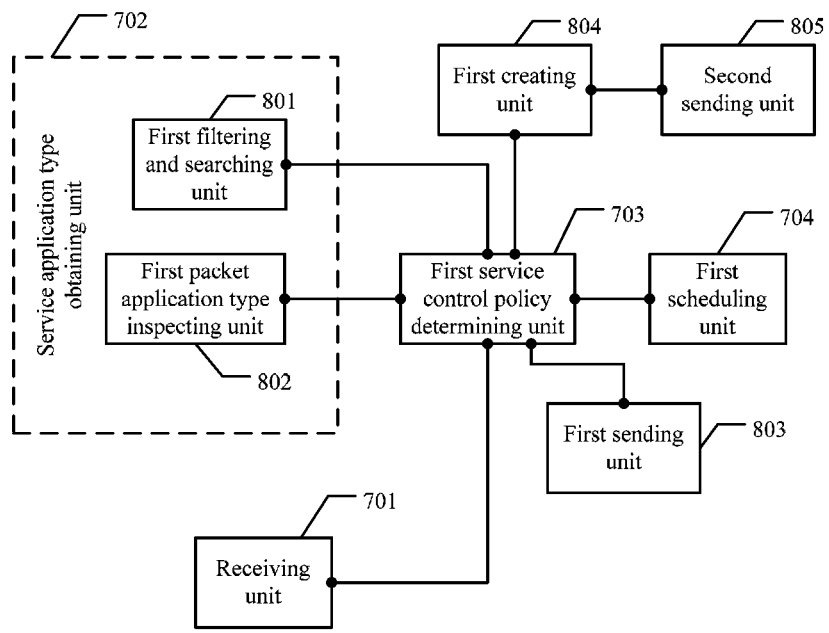
FIG. 8 is another schematic diagram of an evolved NodeB according to an embodiment of the present invention.

For better understanding, FIG. 8 illustrates an embodiment of an evolved NodeB according to an embodiment of the present invention. The evolved NodeB includes the receiving unit 701, the service application type obtaining unit 702, the first service control policy determining unit 703, and the first scheduling unit 704 illustrated in the embodiment illustrated in FIG. 7. The description of this embodiment is completely the same as that of the embodiment illustrated in FIG. 7, and is not further described herein.

The service application type obtaining unit 702 includes any one of the following two units:

a first filtering and searching unit 801, configured to determine, by using a filter, an identity of a flow to which a received packet belongs, search for a service application type corresponding to the identity of the flow to which the received packet belongs in mapping between an identity of a flow and a service application type, where the mapping between the identity of the flow and the service application type is obtained by the evolved NodeB from the PDN-GW; or, a first packet application type inspecting unit 802, configured to perform packet application type inspection on a packet to determine a service application type corresponding to the packet.

The evolved NodeB provided in the embodiment of the present invention may further include:

a first sending unit 803, configured to send a received packet to an inspecting entity;

a first creating unit 804, configured to set up mapping between an identity of a flow to which a packet belongs and an application type; and a second sending unit 805, configured to send the mapping between the identity of the flow to which the packet belongs and the application type to the PDN-GW.

In the embodiment of the present invention, working modes of the evolved NodeB have the following three types:

(1) The receiving unit 701 receives correspondence between a service application type and a service control policy from a first entity; the first sending unit 803 sends a received packet to an inspecting entity; the inspecting entity feeds back a service application type corresponding to the packet to the service application type obtaining unit 702; after the service application type obtaining unit 702 obtains the service application type corresponding to the packet, the first service control policy determining unit 703 determines a service control policy corresponding to the packet according to the correspondence between the service application type and the service control policy received by the receiving unit 701 and the service application type corresponding to the packet obtained by the service application type obtaining unit 702, and sends the obtained service control policy to the first scheduling unit 704; the first scheduling unit 704 performs resource scheduling on the packet according to the service control policy corresponding to the packet. In addition, the first creating unit 804 sets up correspondence between an identity of a flow to which a packet belongs and an application type, and sends the mapping to the second sending unit 805; the second sending unit 805 sends the mapping between the identity of the flow to which the packet belongs and the application type to the PDN-GW for subsequent use.

(2) The receiving unit 701 receives correspondence between a service application type and a service control policy from a first entity; the first filtering and searching unit 801 included in the service application type obtaining unit 702 obtains a service application type corresponding to the packet; the first filtering and searching unit 801 determines, by using a filter, an identity of a flow to which the received packet belongs, and searches for a service application type corresponding to the identity of the flow to which the received packet belongs in mapping between an identity of a flow and a service application type, where the mapping between the identity of the flow and the service application type is obtained by the evolved NodeB from the PDN-GW.

After the first filtering and searching unit 801 obtains the service application type corresponding to the packet, the first service control policy determining unit 703 determines a service control policy corresponding to the packet according to the correspondence between the service application type and the service control policy received by the receiving unit 701 and the service application type corresponding to the packet obtained by the service application type obtaining unit 702, and sends the obtained service control policy to the first scheduling unit 704; the first scheduling unit 704 performs resource scheduling on the packet according to the service control policy corresponding to the packet. In addition, the first creating unit 804 sets up mapping between an identity of a flow to which a packet belongs and an application type, and sends the mapping to the second sending unit 805; the second sending unit 805 sends the mapping between the identity of the flow to which the packet belongs and the application type to the PDN-GW for subsequent use.

(3) The receiving unit 701 receives correspondence between a service application type and a service control policy from a first entity; the first packet application type inspecting unit 802 included in the service application type obtaining unit 702 performs packet application type inspection on the packet to determine a service application type corresponding to the packet. After the first packet application type inspecting unit 802 obtains the service application type corresponding to the packet, the first service control policy determining unit 703 determines a service control policy corresponding to the packet according to the correspondence between the service application type and the service control policy received by the receiving unit 701 and the service application type corresponding to the packet obtained by the service application type obtaining unit 702, and sends the obtained service control policy to the first scheduling unit 704; the first scheduling unit 704 performs resource scheduling on the packet according to the service control policy corresponding to the packet. In addition, the first creating unit 804 sets up mapping between an identity of a flow to which a packet belongs and an application type, and sends the mapping to the second sending unit 805; the second sending unit 805 sends the mapping between the identity of the flow to which the packet belongs and the application type to the PDN-GW for subsequent use.

In the embodiment of the present invention, a service control policy corresponding to the packet is obtained according to service control policy information and an obtained service application type corresponding to the packet; and resource scheduling is performed on the packet according to the obtained service control policy corresponding to the packet. The network can differentiate flows to which the packet belongs and perform resource scheduling for a specific service application type without affecting normal operations of other flows, thereby enhancing the flexibility of network control and improving user experience. In addition, because the evolved NodeB performs resource scheduling on the packet, the evolved NodeB can perform service control according to utilization of resources of the evolved NodeB.

Figure 9:
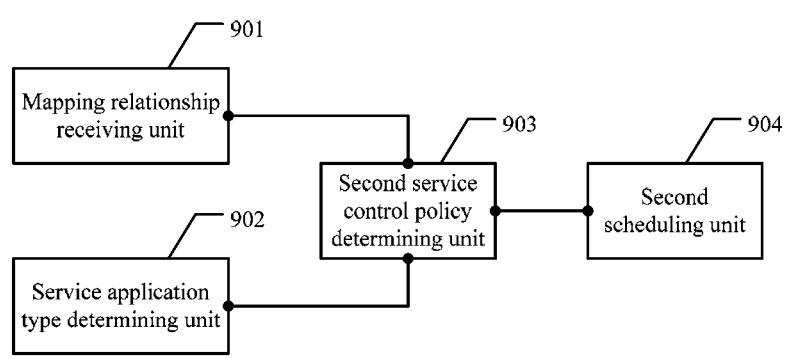
FIG. 9 is a schematic diagram of a packet data network gateway according to an embodiment of the present invention.

FIG. 9 illustrates an embodiment of a packet data network gateway (PDN-GW) according to an embodiment of the present invention, including:

correspondence receiving unit 901, configured to receive correspondence between a service application type and a service control policy from a policy and charging rules function (PCRF) or an evolved NodeB;

a service application type determining unit 902, configured to obtain a service application type corresponding to a received packet;

a second service control policy determining unit 903, configured to determine a service control policy corresponding to the packet according to the correspondence between the service application type and the service control policy and the service application type corresponding to the packet; and a second scheduling unit 904, configured to perform resource scheduling on the packet according to the service control policy corresponding to the packet.

In the embodiment of the present invention, the correspondence receiving unit 901 receives correspondence between a service application type and a service control policy from a policy and charging rules function (PCRF) or an evolved NodeB, and sends the correspondence to the second service control policy determining unit 903; then, the service application type determining unit 902 determines a service application type corresponding to a received packet and sends the service application type to the second service control policy determining unit 903; the second service control policy determining unit 903 determines a service control policy corresponding to the packet according to the received correspondence and the service application type corresponding to the packet, and sends the obtained service control policy to the second schedule controlling unit 904; the second scheduling unit 904 performs resource scheduling on the packet according to the service control policy corresponding to the received packet.

In the embodiment of the present invention, a PDN-GW performs resource scheduling on a packet by using a service control policy corresponding to the packet, which can effectively avoid affecting other flows when resource scheduling is performed on the packet, thereby enhancing the flexibility of network policy control and improving user experience.

Figure 10:
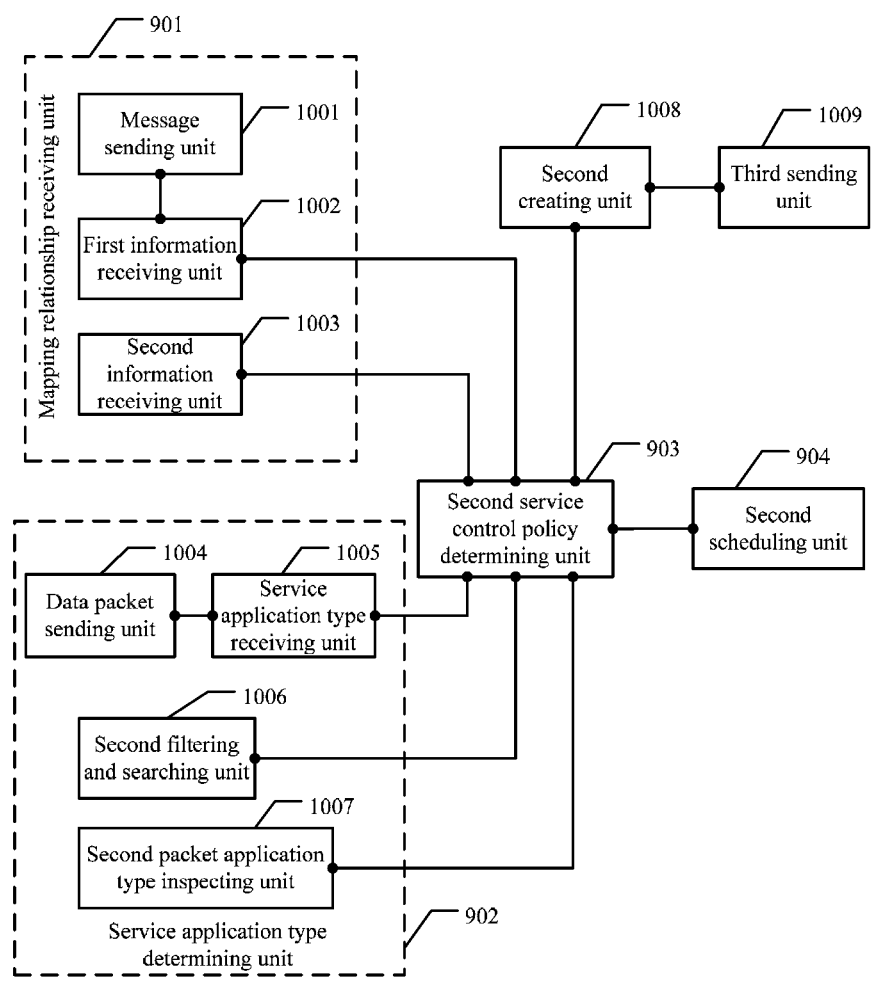
FIG. 10 is another schematic diagram of a packet data network gateway according to an embodiment of the present invention.

For better understanding, FIG. 10 illustrates an embodiment of a service data network gateway, including: the correspondence receiving unit 901, the service application type determining unit 902, the second service control policy determining unit 903, and the second scheduling unit 904 illustrated in the embodiment in FIG. 9. The description of this embodiment is completely the same as that of the embodiment illustrated in FIG. 9, and is not further described herein.

The correspondence receiving unit 901 included in the service data network gateway provided in the embodiment of the present invention is any one of the following two forms:

(1) a message sending unit 1001, configured to send an IP-CAN session setup request message to a PCRF;

a first information receiving unit 1002, configured to receive service control policy information fed back by the PCRF, where the service control policy information includes correspondence between a service application type and a service control policy.

(2) a second information receiving unit 1003, configured to receive service control policy information from an evolved NodeB.

In the embodiment of the present invention, the service application type determining unit 902 included in the service data network gateway is any one of the following three forms:

(1) a packet sending unit 1004, configured to send a received packet to an inspecting entity;

a service application type receiving unit 1005, configured to receive a service application type that is corresponding to the packet and is fed back by the inspecting entity, where the inspecting entity is configured to inspect the service application type corresponding to the packet.

(2) a second filtering and searching unit 1006, configured to determine, by using a filter, an identity of a flow to which a received packet belongs, and search for a service application type corresponding to the identity of the flow to which the received packet belongs in mapping between an identity of a flow and a service application type. The mapping between the identity of the flow and the service application type is obtained by the PDN-GW from the evolved NodeB.

(3) a second packet application type inspecting unit 1007, configured to perform packet application type inspection on the packet to determine a service application type corresponding to the packet.

In the embodiment of the present invention, the following may be further included:

a second creating unit 1008, configured to set up mapping between an identity of a flow to which a packet belongs and an application type; and a third sending unit 1009, configured to send the mapping between the identity of the flow to which the packet belongs and the application type to the evolved NodeB.

In the embodiment of the present invention, the working mode of the service data network gateway is as follows:

The message receiving unit 1001 included in the correspondence receiving unit 901 sends an IP-CAN session setup request message to a PCRF; the first information receiving unit 1002 receives service control policy information fed back by the policy and charging rules function (PCRF), or the second information receiving unit 1003 included in the correspondence receiving unit 901 receives service control policy information sent by the evolved NodeB, where the service control policy information includes correspondence between a service application type and a service control policy.

The correspondence receiving unit 901 sends the service control policy information to the service application type determining nit 902, and the service application type determining unit obtains a service application type corresponding to the packet by using the following three ways:

(1) The packet sending unit 1004 included in the service application type determining unit 902 sends a received packet to the inspecting entity; after inspecting the packet, the inspecting entity feeds back a service application type corresponding to the packet to the service application type receiving unit 1005. In this way, the service application type determining unit 902 obtains the service application type corresponding to the packet.

(2) The second filtering and searching unit 1006 included in the service application type determining unit 902 determines, by using a filter, an identity of a flow to which a received packet belongs, and searches for a service application type corresponding to the identity of the flow to which the received packet belongs in mapping between an identity of a flow and a service application type. The mapping between the identity of the flow and the service application type is obtained by the PDN-GW from the evolved NodeB.

(3) The second packet application type inspecting unit 1007 included in the service application type determining unit 902 performs packet application type inspection on the packet to determine a service application type corresponding to the packet.

The service application type determining unit 902 sends the obtained service application type to the second service control policy determining unit 903; the second service control policy determining unit 903 determines a service control policy corresponding to the packet according to the received correspondence and the service application type corresponding to the packet, and sends the obtained service control policy to the second schedule controlling unit 904; the second scheduling unit 904 performs resource scheduling on the packet according to the service control policy corresponding to the received packet. In addition, the second service control policy unit 903 sends the service control policy to the second creating unit 1008; the second creating unit 1008 sets up mapping between an identity of a flow to which a packet belongs and an application type, and sends the mapping to the third sending unit 1009; the third sending unit 1009 sends the mapping between the identity of the flow to which the packet belongs and the application type to the evolved NodeB.

In the embodiment of the present invention, a service control policy corresponding to a packet is obtained according to service control policy information and obtained service application type corresponding to the packet; and resource scheduling is performed on the packet according to the obtained service control policy corresponding to the packet. The network can differentiate flows to which the packet belongs and perform resource scheduling for a specific service application type without affecting normal operations of other flows, thereby enhancing the flexibility of network control and improving user experience. In addition, because the evolved NodeB performs resource scheduling on the packet, the evolved NodeB can perform service control according to utilization of resources of the evolved NodeB.

Figure 11:
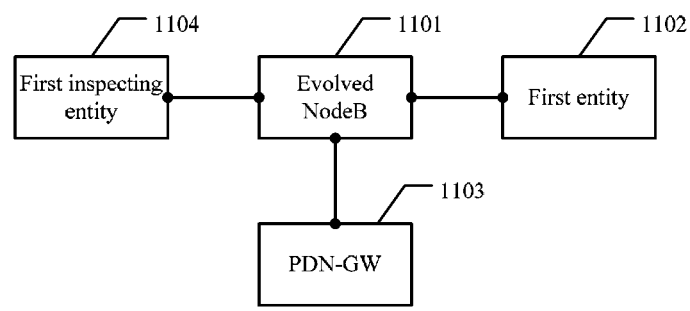
FIG. 11 is a schematic diagram of a service control system according to an embodiment of the present invention.

FIG. 11 illustrates an embodiment of a service control system according to an embodiment of the present invention, including:

an evolved NodeB 1101 and a first entity 1102.

The evolved NodeB 1101 is configured to receive correspondence between a service application type and a service control policy from the first entity, obtain a service application type corresponding to a received packet, determine a service control policy corresponding to the packet according to the correspondence between the service application type and the service control policy and the service application type corresponding to the packet, and perform resource scheduling on the packet according to the service control policy corresponding to the packet. Optionally, the evolved NodeB 1101 is the same as the evolved NodeB described in the embodiment illustrated in FIG. 7, and is not further described herein.

The first entity 1102 is configured to send the correspondence between the service application type and the service control policy to the evolved NodeB 1101.

In the embodiment of the present invention, the service control system may further include:

a PDN-GW 1103, configured to send mapping between an identity of a flow and a service application type to the evolved NodeB 1101.

In the embodiment of the present invention, the service control system may further include:

a first inspecting entity 1104, configured to inspect a service application type corresponding to a packet, and send the service application type corresponding to the packet to the evolved NodeB 1101.

The first inspecting entity 1104 may be located in a packet data network gateway (PDN-GW), or may be an independent entity.

If the PDN-GW 1103 in the service control system sends the mapping between the identity of the flow and the service application type to the evolved NodeB 1101, the evolved NodeB 1101 also needs to determine, by using a filter, an identity of a flow to which a received packet belongs, and search for a service application type corresponding to the identity of the flow to which the received packet belongs in the mapping between the identity of the flow and the service application type.

If there is a first inspecting entity 1104 in the service control system, the evolved NodeB 1101 may send the packet to the first inspecting entity 1104, and the first inspecting entity 1104 inspects a service application type corresponding to the packet.

The following describes the working procedure of the service control system provided in this embodiment.

In this embodiment, the evolved NodeB 1101 receives correspondence between a service application type and a service control policy from the first entity 1102, and the evolved NodeB 1101 may further perform resource scheduling on the received packet according to the received correspondence.

In the process of performing resource scheduling on the packet by the evolved NodeB 1101, the PDN-GW 1103 sends the mapping between the identity of the flow and the service application type to the evolved NodeB 1101, and sends filter information to the evolved NodeB 1101; the evolved NodeB 1101 obtains the identity of the flow corresponding to the packet according to the filter information, and searches the mapping between the identity of the flow and the service application type for a service application type corresponding to the packet. This is a method for obtaining the service application type by the evolved NodeB 1101. The evolved NodeB 1101 may obtain the service application type corresponding to the packet by using another method. The evolved NodeB 1101 sends a packet to the first inspecting entity 1104; the first inspecting entity 1104 feeds back a service application type corresponding to the packet to the evolved NodeB 1101.

Figure 12:
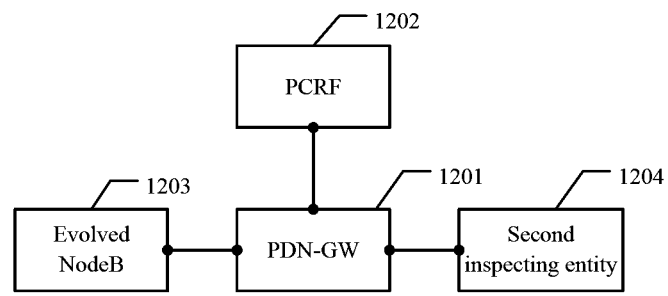
FIG. 12 is another schematic diagram of a service control system according to an embodiment of the present invention.

In the embodiment of the present invention, the service control system may be implemented in another form. FIG. 12 illustrates an embodiment of a service control system according to an embodiment of the present invention, including:

a PDN-GW 1201, a PCRF 1202, or an evolved NodeB 1203.

The PDN-GW 1201 is configured to receive correspondence between a service application type and a service control policy from a policy and charging rules function (PCRF) or an evolved NodeB, obtain a service application type corresponding to a received packet, determine a service control policy corresponding to the packet according to the correspondence between the service application type and the service control policy and the service application type corresponding to the packet, and perform resource scheduling on the packet according to the service control policy corresponding to the packet. Optionally, the PDN-GW 1201 is the same as the PDN-GW described in the embodiment illustrated in FIG. 9, and is not further described herein.

The PCRF 1202 or the evolved NodeB 1203 is configured to send the correspondence between the service application type and the service control policy to the PDN-GW 1201.

In the embodiment of the present invention, the service control system may further include:

a second inspecting entity 1204, configured to inspect a service application type corresponding to the packet, and send the service application type corresponding to the packet to the PDN-GW 1201.

The second inspecting entity 1204 may be located in the PDN-GW 1201 or in the evolved NodeB 1203, or may be an independent entity.

In the embodiment of the present invention, the PDN-GW 1201 receives correspondence between a service application type and a service control policy from the PCRF 1202 or the evolved NodeB 1203, and performs resource scheduling on a packet according to the received correspondence; in the process of performing resource scheduling on the packet by the PDN-GW 1201, the PDN-GW 1201 may send a packet to the second inspecting entity 1204; the second inspecting entity 1204 inspects the packet to obtain a service application type corresponding to the packet, and feeds back the service application type corresponding to the packet to the PDN-GW 1201.

Persons of ordinary skill in the art may understand that all or a part of the steps of the method in the embodiments may be implemented by a program instructing relevant hardware. The program may be stored in a computer readable storage medium. The storage medium may be a read-only memory, a magnetic disk, or an optical disk.

Detailed above are a service control method and a service control system, an evolved NodeB, and a packet data network gateway. It is apparent that those skilled in the art can make various modifications and variations to the specific implementation and applicable scope without departing from the idea of the embodiments of the present invention. In conclusion, the content of the specifications should not be understood as a limitation to the present invention.

What is claimed is:

1. A service control method, comprising:
receiving, by an evolved NodeB, a packet;
determining, by the evolved NodeB, a service control policy corresponding to the packet according to correspondence between the service control policy and a service application type corresponding to the packet; and
performing, by the evolved NodeB, resource scheduling on the packet according to the service control policy corresponding to the packet by determining an identity of a flow to which the packet belongs and at least one of:
controlling the transmission and scheduling of resources of all or some flows of a user according to the service control policy corresponding to the packet, wherein controlling the transmission and scheduling of resources of all or some flows of a user includes:
determining whether a privacy policy for each of all or some flows allows inspection of the flows,
delivering service control policy information in a process of setting up the all or some flows of the user when the privacy policy allows inspection of the flows, and
differentiating flows of the user to which the packet belongs from other flows, and
controlling the transmission and scheduling of resources of a specific flow of all users or a group of users according to the service control policy corresponding to the packet, wherein controlling the transmission and scheduling of resources of the specific flow of all users or the group of users includes:
determining whether a privacy policy for the specific flow allows inspection of the specific flow
delivering the service control policy corresponding to the packet in a process of setting up the specific flow for a first time or in a process of updating the service control policy when the privacy policy allows inspection of the specific flow, and
differentiating the specific flow to which the packet belongs from other flows.

2. The method according to claim 1, wherein the correspondence between the service application type and the service control policy is stored by the evolved NodeB.

3. The method according to claim 1, wherein the correspondence between the service application type and the service control policy is carried in service control policy information sent from a first entity, wherein the first entity is configured to implement a policy and charging enforcement function.

4. The method according to claim 1, the method further comprising:
obtaining, by the evolved NodeB, the service application type corresponding to the packet.

5. The method according to claim 4, wherein
the service application type corresponding to the packet is sent from an inspecting entity to the evolved NodeB, wherein the inspecting entity is configured to inspect the service application type corresponding to the packet.

6. The method according to claim 5, wherein the inspecting entity is located in a packet data network gateway (PDN-GW).

7. The method according to claim 4, wherein the obtaining, by the evolved NodeB, the service application type corresponding to the packet comprises:
determining, by the evolved NodeB by using a filter, an identity of a flow to which the packet belongs;
searching, by the evolved NodeB, for the service application type corresponding to the identity of the flow to which the packet belongs, in mapping between the identity of the flow and the service application type.

8. The method according to claim 7, wherein the mapping between the identity of the flow and the service application type is obtained by the evolved NodeB from a packet data network gateway (PDN-GW).

9. The method according to claim 7, wherein the mapping between the identity of the flow and the service application type is stored by the evolved NodeB.

10. The method according to claim 7, wherein information of the filter is obtained by the evolved NodeB from the PDN-GW.

11. A device, comprising a transmitter, a processor and a memory, wherein:
the transmitter is configured to receive a packet;
the processor is configured to determine a service control policy corresponding to the packet according to correspondence between the service control policy and a service application type corresponding to the packet; and
to perform resource scheduling according to the service control policy corresponding to the packet
and to determine an identity of a flow to which the packet belongs and at least one of:
control the transmission and scheduling of resources of all or some flows of a user according to the service control policy corresponding to the packet, wherein controlling the transmission and scheduling of resources of all or some flows of a user includes:
determining whether a privacy policy for each of all or some flows allows inspection of the flows,
delivering service control policy information in a process of setting up the all or some flows of the user when the privacy policy allows inspection of the flows, and
differentiating flows of the user to which the packet belongs from other flows, and
control the transmission and scheduling of resources of a specific flow of all users or a group of users according to the service control policy corresponding to the packet, wherein controlling the transmission and scheduling of resources of the specific flow of all users or the group of users includes:
determining whether a privacy policy for the specific flow allows inspection of the specific flow,
delivering the service control policy corresponding to the packet in a process of setting up the specific flow for a first time or in a process of updating the service control policy when the privacy policy allows inspection of the specific flow, and
differentiating the specific flow to which the packet belongs from other flows.

12. The device according to claim 11, the memory is configured to store the correspondence between the service application type and the service control policy.

13. The device according to claim 11, wherein the transmitter is further configured to receive service control policy information carrying the correspondence between the service application type and the service control policy.

14. The device according to claim 11, wherein the transmitter is further configured to receive the service application type corresponding to the packet from an inspecting entity, wherein the inspecting entity is configured to inspect the service application type corresponding to the packet.

15. The device according to claim 11, wherein the processor is further configured to determine by using a filter an identity of a flow to which the packet belongs, and search, in mapping between the identity of the flow and the service application type, for the service application type corresponding to the identity of the flow to which the packet belongs.

16. The device according to claim 15, wherein the transmitter is further configured to receive the mapping between the identity of the flow and the service application type from a packet data network gateway (PDN-GW).

17. The device according to claim 15, wherein the memory is further configured to store the mapping between the identity of the flow and the service application type.

18. The device according to claim 15, wherein the transmitter is further configured to receive information of the filter from a PDN-GW.

19. The device according to claim 11, wherein the device is an evolved NodeB.

20. A system, comprising:
an evolved NodeB, configured to receive a packet, and perform resource scheduling according to a service control policy corresponding to the packet, wherein the service control policy corresponding to the packet is determined according to correspondence between the service control policy and a service application type corresponding to the packet,
wherein performing resourcing scheduling according to the service control policy corresponding to the packet comprises determining an identity of a flow to which the packet belongs and at least one of:
control the transmission and scheduling of resources of all or some flows of a user according to the service control policy corresponding to the packet, wherein controlling the transmission and scheduling of resources of all or some flows of a user includes:
determining whether a privacy policy for each of all or some flows allows inspection of the flows,
delivering service control policy information in a process of setting up the all or some flows of the user when the privacy policy allows inspection of the flows, and
differentiating flows of the user to which the packet belongs from other flows, and
control the transmission and scheduling of resources of a specific flow of all users or a group of users according to the service control policy corresponding to the packet, wherein controlling the transmission and scheduling of resources of the specific flow of all users or the group of users includes:
determining whether a privacy policy for the specific flow allows inspection of the specific flow,
delivering the service control policy corresponding to the packet in a process of setting up the specific flow for a first time or in a process of updating the service control policy when the privacy policy allows inspection of the specific flow, and
differentiating the specific flow to which the packet belongs from other flows.

\* \* \* \* \*